United States Patent
Fillmen

[11] 3,913,255
[45] Oct. 21, 1975

[54] FISHING LINE STRIKE SIGNALING APPARATUS

[76] Inventor: John H. B. Fillmen, 701 Terrace Blvd., Orlando, Fla. 32803

[22] Filed: Sept. 23, 1974

[21] Appl. No.: 508,188

[52] U.S. Cl. ................................. 43/17; 43/17
[51] Int. Cl.² ................................. A01K 97/12
[58] Field of Search ................... 43/17, 16, 17.1

[56] References Cited
UNITED STATES PATENTS

| | | | |
|---|---|---|---|
| 2,580,956 | 1/1952 | Reddick | 43/17 |
| 2,741,055 | 4/1956 | Weber, Jr. | 43/17 |
| 2,973,599 | 3/1961 | Olson | 43/17 |
| 3,134,187 | 5/1964 | Blakely | 43/17 |

Primary Examiner—Warner H. Camp
Attorney, Agent, or Firm—Duckworth, Hobby & Allen

[57] ABSTRACT

A fishing line holding and strike signaling apparatus adapted to hold a plurality of fishing lines simultaneously and to signal when a fish strikes any one of the lines. The line holding members have means for adjusting the pressure to compensate for different fishing conditions and a signaling means that has a buzzer and a light, which light can also be used independently to illuminate the device at night. Special camming controls allow for the separation of the line gripping members and the master switch can be used to energize or disable the alarm or to turn on the light.

8 Claims, 4 Drawing Figures

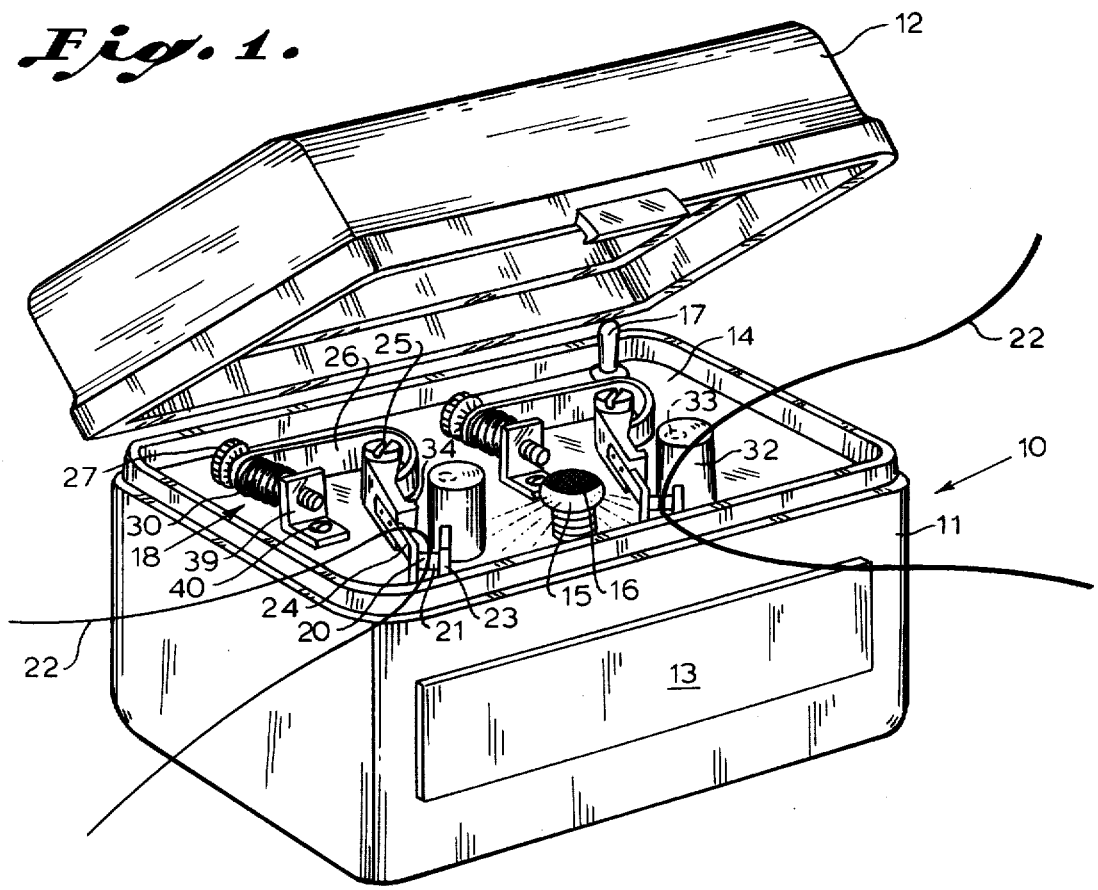
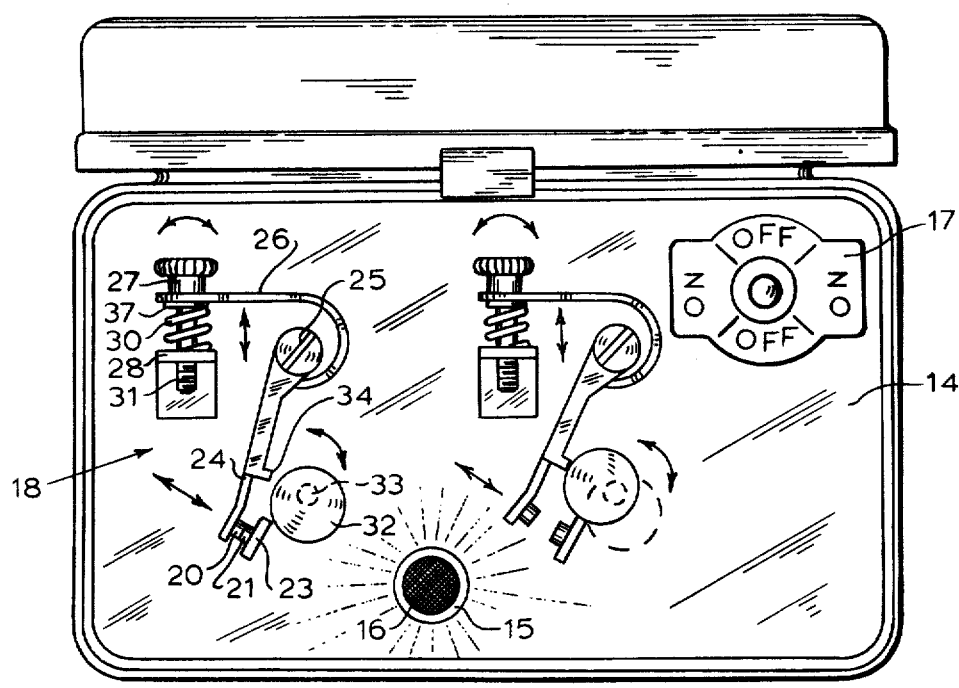

FISHING LINE STRIKE SIGNALING APPARATUS

BACKGROUND OF THE INVENTION

The present invention relates to fishing line strike signaling devices for attaching a fishing line on and a rod and reel and which sounds an alarm when a fish strikes the line.

In the past, there has been a great variety of fish strike alarms and these typically fall into several groups. One group provides an alarm and an automatic hooking device for use in ice fishing, and the like, for attempting to hook the fish when it strikes. The most common type of fish striking alarm utilizes a device for signaling the movement of the rod when a fish takes the bait and pulls the line. This system is typically combined with a rod holding device which holds the rod and actuates a signal when the rod is pulled on. The signal may be a light, buzzer, or bell. The prior art most closely associated with the present invention provides means for gripping the line and signaling when the line is either pulled or when the line is pulled from the gripping means. In some cases this allows a completed circuit to actuate the alarm. Typical prior art may be seen in U.S. Pat. No. 3,798,630 for a FISHING LINE MOTION SENSING ALARM providing a clothes pin type clip to hold a fishing line and to signal string movement which operates a switch and U.S. Pat. No. 2,574,333 for a FISHING POLE LIGHT ATTACHMENT in which a fishing line is held between a clothes pin type clip which when pulled actuates the lamp. This latter patent is similar to U.S. Pat. No. 3,250,036 for a LINE HOLDING SIGNAL ATTACHMENT FOR FISHING RODS except the pulling of the line in this patent closes the grounding circuit that actuates the lamp. U.S. Pat. No. 2,867,054 teaches a FISHING LINE WARNING DEVICE for actuating a flashlight and/or bell upon actuation of a switch when the line is pulled taut. Patents in which the fishing line actuates a switch by the pulling of the switch, such as when the line goes taut, may be seen in U.S. Pat. No. 2,995,853; U.S. Pat. No. 3,389,489; U.S. Pat. No. 3,188,767; U.S. Pat. No. 2,663,110; U.S. Pat. No. 3,364,610 and U.S. Pat. No. 3,280,496.

Prior patents which actuate the switch by pulling the line from a clip which then closes the circuit by the clip members coming together can be seen in U.S. Pat. No. 3,702,513 for a BITE DETECTOR FOR USE WITH FISHING LINES; U.S. Pat. No. 2,986,835 for FISHING ROD BITE SIGNALING LIGHT; U.S. Pat. No. 3,134,187 for a FISHING SIGNAL DEVICE and U.S. Pat. No. 2,978,828 for a SIGNALING DEVICE. These latter patents, which are believed to be the closest prior art patents, teach a signaling means actuated by pulling of the fishing line from between holding members to actuate a switch.

The present invention provides various improvements including a compact box for holding a plurality of lines and line gripping members which may be easily adjusted to vary the pressure depending upon whether the fisherman is using it in surf, which would require greater pressure than when being used for fishing from a dock or pier in still waters. The present fish strike alarm also provides a buzzer and a light signaling means in which the light signaling means can be used to illuminate the area for attaching the fishing lines in the dark and as a light bulb with a deflecting surface on top to prevent blinding of the individual using the system, and a master switch for actuating the light without actuating the buzzer alarm. Similarly, the present invention provides camming arms for holding each pair of line gripping members separated when using only one fishing rod or when connecting and disconnecting lines. Any of a plurality of lines can actuate the same signaling device upon a fish striking the line.

SUMMARY OF THE INVENTION

A fishing line strike signaling apparatus is provided having an enclosing case with a base mounted therein. The base has a plurality of line gripping members mounted therein, each line gripping member being adapted to close a circuit, actuating an alarm when the line is pulled from between the line gripping members by the strike of a fish. An electrical signaling means has a master switch means for connecting and disconnecting the signal through the line gripping members and a spring applies pressure to drive the line gripping members towards each other. Pressure adjusting means are provided for varying the pressure on the spring to provide greater or lesser force between the line gripping members. A lamp is also provided with a reflector for usage of the apparatus in the dark and special switching and camming members are provided for turning on or off portions of the system.

BRIEF DESCRIPTION OF THE DRAWINGS

Other objects, features and advantages of this invention will be apparent from a study of the written description and the drawings in which:

FIG. 1 is a perspective view of a preferred embodiment of the present invention;

FIG. 2 is a top plan view of the embodiment of FIG. 1;

DESCRIPTION OF THE PREFERRED EMBODIMENT

Figure 3:
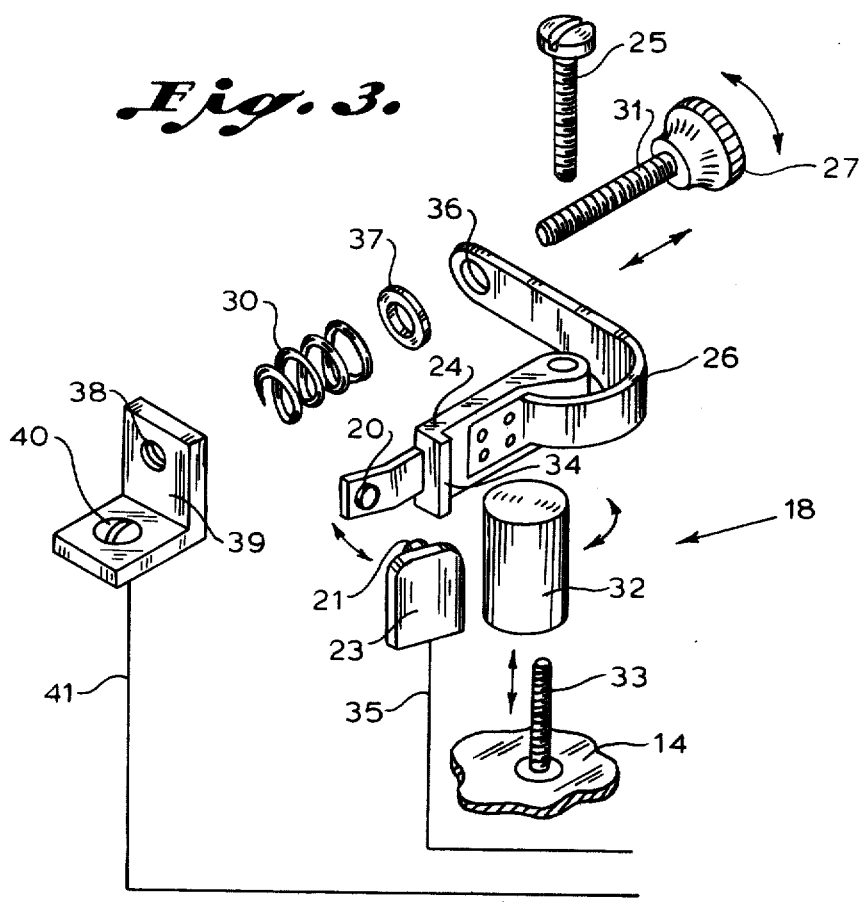
FIG. 3 is an exploded view of the line gripping members.

Referring now to FIGS. 1 and 2, the present fish strike alarm 10 is mounted in a case 11 having a top or lid 12 which may be attached to the case 11 by a hinge or may be removably attached with snaps or any means desired. The case 11 has a plate 13 attached to the front thereof for placing a trademark or a person's name. Inside the casing 11 is a base 14 which sits upon ledges for easy removal from the case 11 for ease in assembling, repairing or replacing the batteries in the case 11. All of the operative components are attached to base 14, which base can be any type of material desired or can be mounted on a printed circuit board without departing from the spirit and scope of the invention. The base 14 has a lamp 15 attached thereto with a reflecting surface 16 painted on the top thereof to deflect the light over the surface of the base 14. The base also has a master switch 17 which may be a DPDT three-way switch providing on, off and on positions in which one of the on positions is used for turning the lamp 15 on without energizing the alarm system. The lamp conveniently allows connecting and disconnecting the device during the night time and is also incorporated in the alarm system to come on when a fish strikes the line so that the fisherman can quickly determine which line has a strike. The base also has mounted thereto a pair of fish line gripping members 20 and 21 having fishing lines 22 connected therebetween in FIG. 1. Fish line gripping member 21 is connected to a bracket 23 which is mounted to the base 14 while the gripping member 20 is connected to a pivoting arm 24 which pivots on a pivot pin point 25 and has a spring member 26 attached thereto for spring biasing the arm 24 to drive point 20 against point 21. The back of the spring 26 has a rotatable threaded screw 27 passing therethrough and threaded into a bracket 28 attached to the base 14 and a spring 30 is mounted between the bracket 28 and the spring 26 with the threaded portion 31 of the screw 27 passing through both. Rotation of the screw 27 in one direction or the other will increase or decrease the spring tension and the pressure applied by the point 20 against point 21 thereby allowing adjustments to the holding force holding the line 22. This important feature allows the device to be used in surf fishing where the large waves and surf would otherwise tend to pull the fishing line loose in the absence of a strike thereby providing confusion to the fisherman. A plurality of systems 18 (FIG. 2) allows two or more fishing lines to be used simultaneously with the unit. A camming member 32 is threadedly mounted to a threaded screw 33 which in turn is mounted to the base 14 allowing the camming member 32 which is a cylinder eccentrically mounted to rotate on the threaded member 33 and push against a cam follower 34 to drive the gripping members 20 and 21 apart when rotated. Camming member 32 and a support arm 33 are mounted so that turning the cylinder camming member 32 all the way counterclockwise will open the members 20 and 21 and will abut against the bracket 23 allowing a convenient stop to assure that the member remains open without allowing the camming member 32 to ride on past the largest opening position. This stop also provides a convenient locking device to prevent the cam 32 from inadvertently being unscrewed and detached from its pivot pin 33.

The line gripping assembly 18 is more clearly illustrated in the exploded view of FIG. 3 in which line gripping surface 21 is seen connected to the bracket 23 which is connected to an electrical conductor 35 while line gripping member 20 is connected to a pivot arm 24 which has a conducting surface through to the spring 26 which is also a conducting surface. Pivoting arm 24 is mounted by a pivoting pin or screw 25 to allow the point 20 to pivot onto and off of the line gripping member 21. Spring 26 has an opening 36 therein for the threaded portion 31 of the screw 27 to pass through and includes a washer 37 along with the spring 30 for the threaded screw 27 to pass through into the threaded opening 38 of the bracket 39 which is mounted with a screw 40 to the base 14 of FIGS. 1 and 2. A conductor 41 is connected to the bracket 39 and by way of the screw 27 and spring 26 may provide a conductive path for electricity to the line gripping member 20. Thus, when the line gripping members 20 and 21 come together they will close a circuit between conductors 35 and 41. The cylindrical and eccentrically mounted camming member 32 can be seen mounted to a pin or screw 33 which in turn is mounted to the base 14 for movement against the follower surface 34.

Figure 4:
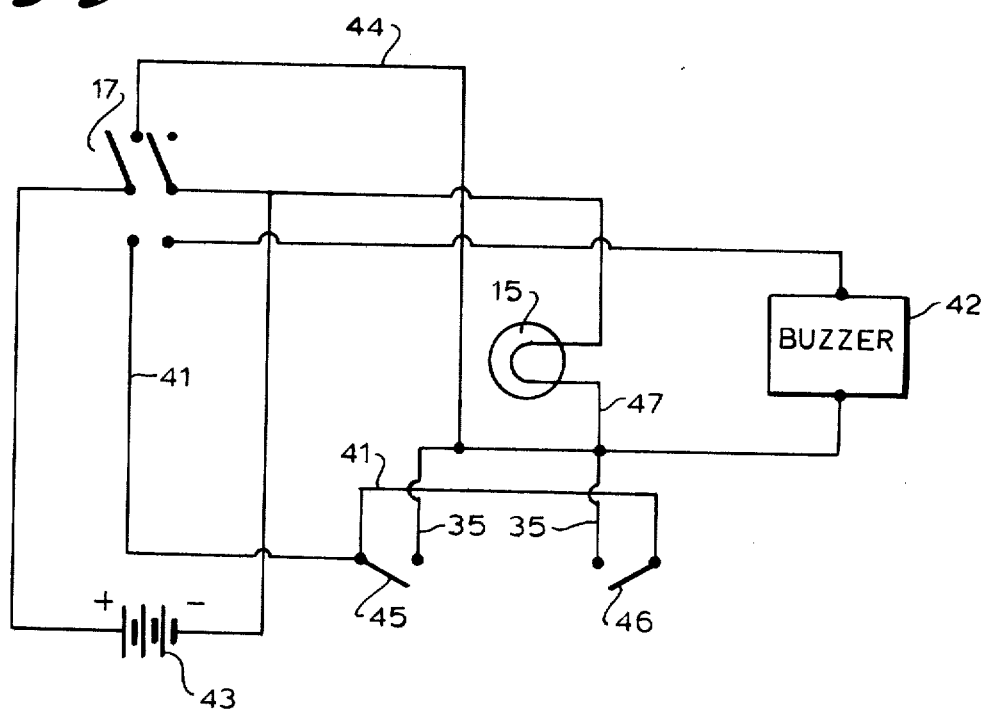
FIG. 4 is a schematic diagram of the electrical circuit.

FIG. 4 shows a schematic diagram of the wiring diagram which is to wire directly beneath the base 14 in FIGS. 1 and 2, and provides a buzzer 42 which may be a bell or electrical buzzer of any type desired but electrical buzzers are commercially available which do not require an extra speaker for making a buzzing noise when a small voltage is applied across the buzzer. Two standard batteries 43 may be utilized for the voltage source and are connected through the lamp 15 when the switch 17 is actuated. Switch 17 is a double pole, double throw switch that can be actuated to disconnect the batteries 43 from the remainder of the system as illustrated in FIG. 4 or can be actuated to connect the lamp through conductor 44 through the lamp 15 back to the negative side of the batteries 43. Similarly, the switch 17 can be connected to the conductor 41 which will pass the current through switches 45 or 46 when either or both are closed. Switches 45 and 46 will be recognized as formed by line gripping members 20 and 21 (FIG. 2) to connect the conductor 41 to the conductor 35. Conductor 35 is connected to the buzzer 42 and back through the negative pole of the switch 17 and back to the negative side of the batteries 43. Simultaneously, conductor 35 is connected to the light 15 and back to the negative side of the batteries 43. Thus, the master switch 17 can turn on the lamp 15 or it can actuate the system to operate the buzzer 42 and the light 15 when either switch 45 or 46 are closed.

It should be clear at this point that a fish strike signaling alarm has been provided for connecting a plurality of fishing lines if desired. It should, however, be clear that the present invention is not to be construed as limited to the particular forms disclosed herein since these are to be regarded as illustrative rather than restrictive.

I claim:

1. A fishing line strike signaling apparatus comprising in combination:

a. a base;
   b. a pair of line gripping members mounted to said base for gripping a fishing line therebetween, a line being adapted for separating said line gripping members, one line gripping member being pivotably mounted to said base to pivot onto and off of the other line gripping member;
   c. electrical signaling means operatively connected across said line gripping members for signaling when said line gripping members contact each other;
   d. an eccentrically mounted member for separating said line gripping members when rotated against said pivotably mounted line gripping member;
   e. spring means connected to said pivotably mounted member for applying the line gripping pressure driving said pair of line gripping means together; and
   f. pressure adjusting means for varying the pressure of said spring means thereby varying the line gripping pressure between said pair of line gripping members, whereby the line gripping means can be varied as desired.

2. The apparatus in accordance with claim 1 having two pairs of line gripping members, two spring means and pressure adjusting means for holding a pair of fishing lines.

3. The apparatus in accordance with claim 2 in which said base is mounted in a case having a liftable top for enclosing said apparatus.

4. The apparatus in accordance with claim 1 having a lamp connected to said base and a switch means and said lamp being operatively connected to said switch means for providing a light source when activated.

5. The apparatus in accordance with claim 4 in which said lamp has a reflector surface on the top thereof to reflect light onto said base.

6. The apparatus in accordance with claim 5 in which said lamp is actuated by said line gripping members making contact.

7. The apparatus in accordance with claim 1 in which said other line gripping member is mounted on a bracket which is mounted onto said base and said bracket is mounted to intersect said eccentrically mounted cylindrical member at a predetermined position.

8. The apparatus in accordance with claim 7 in which said eccentrically mounted cylindrical member is mounted on a threaded member protruding from said base.

* * * * *